March 6, 1956  R. E. BARNABY  2,737,640
AIRCRAFT NAVIGATION INSTRUMENT
Filed Aug. 2, 1954  2 Sheets-Sheet 1

INVENTOR
ROLAND E. BARNABY
BY
ATTORNEY

March 6, 1956     R. E. BARNABY     2,737,640
AIRCRAFT NAVIGATION INSTRUMENT

Filed Aug. 2, 1954     2 Sheets-Sheet 2

INVENTOR
ROLAND E. BARNABY
BY
ATTORNEY

United States Patent Office 2,737,640
Patented Mar. 6, 1956

2,737,640

AIRCRAFT NAVIGATION INSTRUMENT

Roland E. Barnaby, Garden City, N. Y., assignor to Sperry Rand Corporation, a corporation of Delaware Application August 2, 1954, Serial No. 447,231

4 Claims. (Cl. 340—27)

The present invention relates generally to navigation aids for manually piloted aircraft and has reference more particularly to an improvement in the navigation instrument disclosed in copending application Serial No. 437,485, filed June 17, 1954 for Aircraft Navigation Instrument in the names of R. R. Strock and E. R. Dayton, which application relates to navigation instrumentation of the character set forth in detail in copending application Serial No. 436,169, filed June 11, 1954 for Aircraft Navigation Instrument in the name of E. B. Hammond, Jr., and in Patent No. 2,613,352 issued to S. Kellogg, 2nd, on October 7, 1952, entitled "Radio Navigation System." The above applications and patent are assigned to the same assignee as the present invention.

The instrument of the present invention although applicable to many types of aircraft attitude indicators, is particularly adapted to attitude indicators wherein the attitude indicating element thereof is spherical in shape and is pivoted in the instrument housing a considerable distance from the bezel or viewing opening of the instrument for stabilization about the roll and pitch axes of the aircraft. Also, the present invention is especially adapted to instruments of the above type wherein the magnitude of the roll and pitch movements of the aircraft are indicated by relative movements of pointers and scales calibrated in angles of roll and angles of pitch. In the illustrated embodiment of the present invention the angle of pitch is provided by a normally vertical scale delineated on the surface of the stabilized sphere which moves up and down relative to a fixed reference preferably at the center of, and substantially in the plane including, the viewing opening of the instrument while the angle of roll is provided by a roll pointer separately mounted in the instrument housing from the attitude sphere and positioned adjacent the viewing opening and driven in accordance with roll attitude, the pointer cooperating with a fixed scale calibrated in angles of roll delineated at the periphery of the viewing opening. Therefore, since both the roll and pitch scales and associated pointer and index are all located in substantially the same plane that includes the viewing opening, the angle of vision of the attitude instrument of the present invention is greatly increased.

Thus, it is a principal object of the present invention to provide an attitude indicating instrument in which the cone of vision thereof is greatly increased. It is a further object of the present invention to provide an attitude indicating instrument in which both the angle of roll and angle of pitch indicating scales and their respective pointers and indices are all located at substantially the same plane. It is still another object of the present invention to provide an attitude indicator for aircraft in which a substantially spherical member having a horizon-defining line thereon is pivotally mounted in the instrument housing at a considerable distance from the viewing opening thereon for indicating the approximate roll and pitch attitude of the craft while the scales and indices for indicating accurately the angle of roll and pitch are located substantially in the plane including the viewing opening. A further object of the present invention resides in the provision of a roll angle indicator in an attitude-type flight instrument which is completely independent of the pitch angle indication.

Other objects and advantages of the present invention, not at this time particularly enumerated will become readily apparent as the description of a preferred embodiment thereof proceeds, reference being made to the accompanying drawings, wherein.

Figures 1, 2:
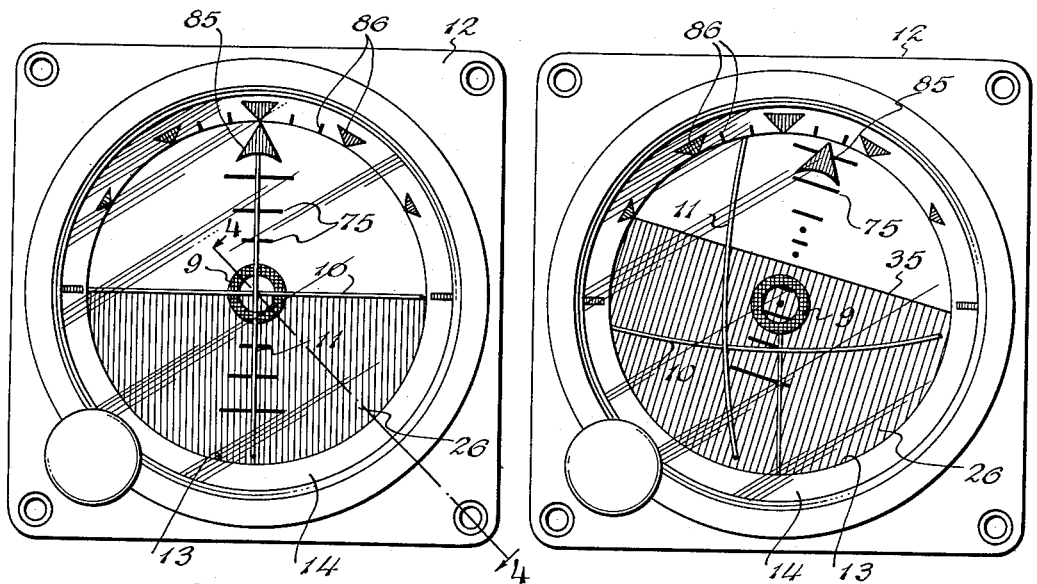
Figs. 1 and 2 are plan views of the face of the instrument embodying the present invention as observed by a pilot, Fig. 1 representing straight and level flight and Fig. 2 representing a diving left turn in response to the dictates of the guidance indicators.

Although the invention can be used in any type of attitude indicating instrument as above stated, it will be described as being applied to the type of instrument illustrated in the aforementioned applications Serial No. 437,485 and Serial No. 436,169, and in Patent No. 2,613,352. As described in these cases such an instrument relieves the pilot from the need of scanning and simultaneously interpreting the information supplied by a number of independent or separately mounted flight instruments. With the instrument of the present invention the pilot is also relieved of the task of anticipating the amount of control demanded by such interpretation and is yet provided with an indication of the information normally supplied by these independent instruments and in addition of the actual amount of craft control applied by the pilot.

This instrument not only supplies information which is the result of a combination of attitude, heading, and radio information which is combined and correlated to provide a displacement of a minimum number of indicating elements such as, for example, meters of the cross pointer type, but further supplies additional information regarding the approximate roll and pitch attitude of the craft when piloted in accordance with the commands of the cross pointers, and furthermore provides the pilot with an accurate measure of the angle of roll and angle of pitch as outlined above. As set forth in the above Kellogg patent, the cross pointer bars or guidance indicators, when symmetrically disposed one with the other relative to a reference index representing the aircraft, the pilot is advised that his craft is flying correctly in accordance with a selected flight plan, although perhaps not on a given or selected flight course. As further stated in the above-mentioned patent, such a plan may call for the use of this indicating system as a flight instrument for "dead-reckoning" flights, or as a radio navigation instrument utilizing radio range system signals, or for making approaches on an instrument landing system (I. L. S.) to an airport under adverse weather conditions. Once a specific flight plan has been selected or chosen, through suitable selector switches, the pilot causes the aircraft to approach and thereafter follow this flight plan by making the indicated attitude changes dictated by the instantaneous deflections of the bars of the cross-pointer indicator. Therefore, to achieve the object of any selected flight plan, it is only necessary for the pilot to follow the dictates of the cross pointer or guidance indicator, interpretation and correlation of the indications of other flight instruments not being necessary.

However, it has been found that although perfectly coordinated flight maneuvers in seeking a selected flight path are achievable by constantly maintaining the guidance pointers symmetrically disposed in the face of the instrument, it has been found preferably desirable to display on the same instrument information representative of the attitude of the craft relative to the horizon which, as set forth in the said Kellogg Patent No. 2,613,352, is the control parameter of the system. With the indicator of the present invention, the information regarding the craft's attitude is displayed relative to the same index against which the guidance indicator is read.

Figure 3:
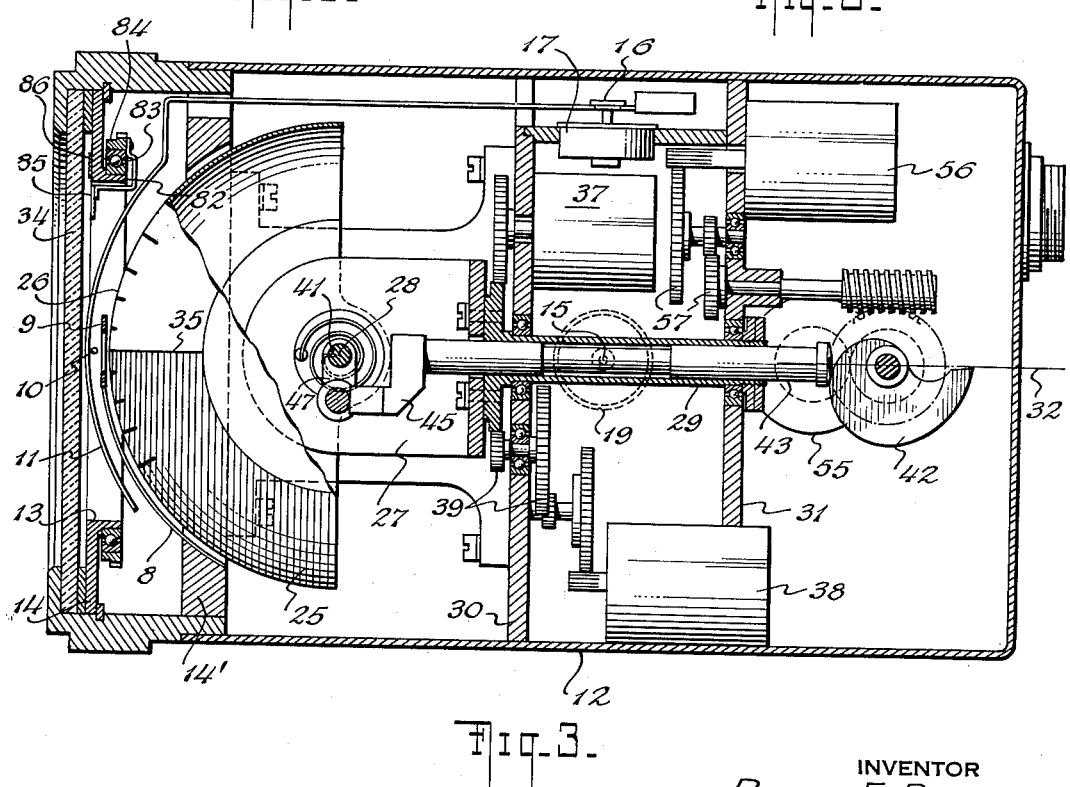
Fig. 3 is a cross section view of the instrument as illustrated in Fig. 1 and taken on the line 3—3 of Fig. 1.

Referring now to the drawings, there is illustrated a preferred embodiment of the present invention in which the azimuth and elevation guidance indicator pointers 10 and 11 are adapted to be respectively pivotally mounted in an instrument housing 12 for movement across a viewing opening 13 in a front wall 14 thereof and relative to a craft reference index 9 supported preferably at the center of the opening 13 on a suitable bracket or curved rod 8 (Fig. 3). The guidance pointers 10 and 11 are mounted in the instrument housing 12 on pivots 15, 16, respectively. The vertical or azimuth guidance pointer actuating means 17 which may be a galvanometer or similar device is energized, in one mode of operation of the instrument as determined by the position of selector switch 65 and switches 18 (Fig. 5), by an electrical signal corresponding to the algebraic sum of signals proportional to the displacement of the craft from a radio course, such as the localizer beam of an instrument landing system, the heading of the aircraft relative to the bearing of the course, and the bank angle or roll attitude of the craft. The horizontal or elevation guidance pointer actuating means 19 is energized, depending on the position of the selector switch 65 and switches 18', by an electrical signal corresponding to the displacement of the craft, from the glide slope beam of an instrument landing system or from the altitude of the craft relative to a predetermined altitude, and a signal proportional to the pitch angle or pitch attitude of the craft. The signals operating the guidance indicators 10 and 11 are supplied by the outputs of summing amplifiers and limiters 20 and 21 of Fig. 5 in a manner set forth in detail in the above-identified Kellogg patent. In the illustrated embodiment of the present invention, it will be noted that the pivots 15, 16 for the pointers 10 and 11 are located in the instrument housing preferably at a considerable distance from the viewing opening 13 so that the movement of the guidance indicators across opening 13 will appear to be substantially parallel to the opening.

The background for guidance indicators 10 and 11 in the illustrated embodiment of the present invention comprises a substantially hemispherical member 25 mounted in the housing 12 in such a position that its viewable surface 26 is disposed substantially within viewing opening 13 in wall 14. The diameter of the hemispherical member 25 is such that the surface thereof extends outwardly or radially in all directions beyond the edge of the circular opening 13. As shown in Fig. 3 a second instrument wall 14' is located in the instrument housing 12 rearwardly displaced from the wall 14 and having an opening therein through which the surface 26 of spherical segment 25 protrudes. The purpose of this wall 14' is to provide not only a rigid support for the instrument elements to the rear thereof, as will become apparent, but also to provide a mask for closing the rest of the interior of the instrument housing from view by the pilot which might otherwise distract the pilot. As illustrated in Fig. 3, hemispherical member 25 is pivotally supported at a considerable distance from the viewing opening 13 in wall 14 on a support element such as a preferably U-shaped gimbal 27 for relative movement about an axis 28 in the instrument normally parallel to the pitch axis of the aircraft. Gimbal 27 in turn is pivotally supported by means of an elongated trunnion 29 journaled in suitable support walls 30, 31 of the instrument housing 12 for rotation about an axis 32 in the instrument parallel to the roll axis of the craft. Support walls 30, 31 are in turn rigidly supported to the instrument bezel by means of wall 14' and bracket 33. Preferably, the gimbal trunnion axis is coincident with the center of the opening 13 in wall 14. Thus, with the above gimbal construction, the hemispherical member 25 is adapted to be positioned by rotation of gimbal 27 about its trunnion axis in accordance with the roll attitude of the aircraft and by rotation of member 25 about axis 28 in the arms of the gimbal in accordance with the pitch attitude of the aircraft. For the purposes of the present invention, hemispherical member 25 is provided with a horizon-defining line 35 which may be delineated on the surface of the member 25 and which normally subdivides the opening 13 into upper and lower areas relative to reference index 9, the area above the horizon line being preferably of a light color and the area below the line being of preferably a darker or contrasting color. It will be understood, however, that the means defining a horizon line may take other forms. For example, a generally hemispherically shaped element may be rigidly secured to gimbal 27 and colored in its entirety in a light shade and that a separate, approximately 120° sector of a sphere of slightly larger diameter than the fixed hemisphere may be pivotally supported on the gimbal 27 for movement about the pitch axis over the surface of the fixed hemisphere and colored in a contrasting or dark shade, the edge of the spherical sector being normally positioned relative to the fixed hemispherical element such as to subdivide the opening into upper and lower areas of contrasting colors.

Figure 5:
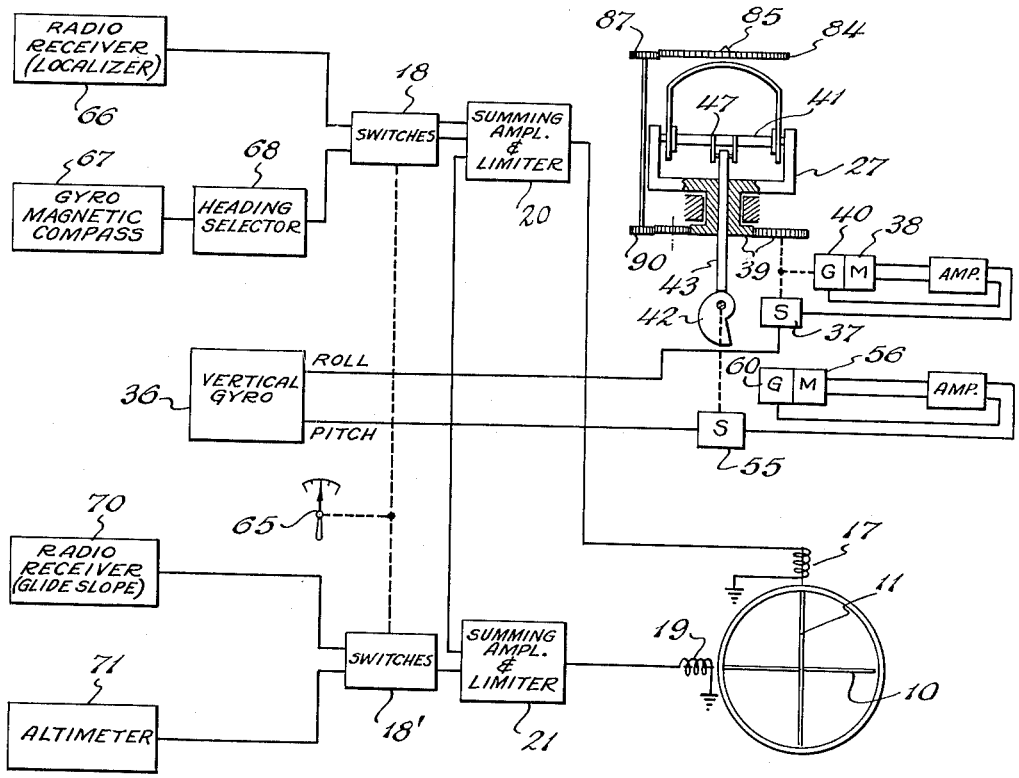
Fig. 5 is a schematic view of a navigation system in which the instrument of the present invention is particularly adaptable.

Gimbal ring 27 and hence, hemispherical member 25 are positioned in accordance with the roll attitude of the craft by means of a positional servo loop between it and a vertical reference which may be a vertical gyro 36 of conventional form illustrated schematically in Fig. 5. The roll servo loop comprises a suitable signal generating device such as a synchro transmitter (not shown) on the roll gimbal of vertical gyro 36 electrically coupled with a corresponding synchro 37 associated with gimbal 27, the output signal of roll synchro 37 corresponding to the difference in position between the position of gimbal ring 27 and the horizontal or roll gimbal of vertical gyro 36. This difference signal or error signal is amplified and applied to roll motor 38 which drives gimbal 27 through suitable gearing 39, to thereby zero the signal at roll synchro 37, at which time the gimbal 27 will be exactly aligned with the gyro gimbal. A suitable speed generator 40 (Fig. 5) may be provided for stabilizing the loop in a conventional manner. Thus, through this roll servo loop, gimbal 27 and hence hemispherical member 25 are positioned in accordance with the roll attitude of the craft as determined by vertical gyro 36.

The pivotal support for hemispherical member 25 on gimbal 27 comprises a shaft 41 journalled in or between the arms of U-shaped gimbal 27 for rotation about axis 28 normally parallel to the pitch axis of the aircraft. Shaft 41, to which hemispherical member 25 is rigidly attached, is rotated about axis 28 by means of a cam 42 which, in turn, is positioned in accordance with the pitch attitude of the craft as described in detail in the above-noted application Serial No. 437,485, by means of shaft 43, arm 45, and crank arm 47.

As also described in Serial No. 437,485 the shape of cam 42, of course, determines its lift or throw and, therefore, the character and extent of movement of hemispherical member 25 about pitch axis 28. It has been found that it is desirable to accentuate the movement of horizon-defining line 35 relative to reference 9 for small changes in the pitch attitude of the craft. Furthermore, it may be desirable to reduce the movement of the horizon line 25 as the pitch attitude of the craft changes toward plus or minus 90°. In other words, spherical member 25 need not move through plus or minus 90° when the craft is at a plus or minus 90° attitude. For this purpose, the cam 42 may have a contour such as to provide a lift which is proportional to a non-linear function of the pitch attitude of the craft. However, it is to be understood that the contour of the cam 42 may be so shaped as to provide any desired movement of horizon line 35, relative to index 9 or opening 13, either linear with or, as above stated, in accordance with any function of the pitch attitude of the craft.

A similar servo loop is employed for positioning the hemispherical members 25 in accordance with the pitch attitude of the craft as determined by gyro 36. Referring again to Fig. 5, pitch synchro 55 is electrically coupled with a suitable pitch signal generating device such as a synchro transmitter (not shown) on vertical gyro 36 and supplies a signal corresponding to the error between the position of hemispherical member 25 about the pitch axis and the pitch attitude of the aircraft, this error signal being amplified and supplied to pitch motor 56 which drives cam 42 through suitable reduction gearing 57, worm 58 and worm gear 59 in a direction and an amount to reduce the error signal to zero. Again, a suitable speed generator 60 may be provided for stabilizing the pitch servo loop. Therefore, cam 42, shaft 43 and hence hemispherical member 25 are positioned in accordance with the pitch attitude of the craft.

In order to provide the pilot with an accurate measure of the angle of pitch of the craft as well as the general pitch and roll attitude as defined by movement of the horizon line 35, the spherical member 25 is provided with a pitch scale comprising a series of substantially horizontal lines and dots 75 spaced one above the other in a direction generally perpendicular to horizon line 35. The lines may denote 10° pitch intervals and the dots 5° pitch intervals, for example. Thus, when the lines and dots are viewed relative to the reference index 9, the pilot may determine accurately the pitch angle of the craft.

In order to create an illusion of horizon depth or distance, the horizontal lines of the pitch scale may be of decreasing length as they approach horizon line 35, as illustrated in Figs. 1 and 2. Furthermore in this connection, the shading of the contrasting colors above and below the sphere may also be such as to enhance the illusion of horizon depth. For example, the shade of the sky portion of the sphere may be quite light near the horizon line 35 and become darker and darker towards the top of the sphere. Likewise the shade of the ground or earth portion may be relatively light at line 35 and become darker towards the bottom of the sphere.

It will be noted that the index 9 which serves not only as the aircraft reference index for the guidance indicators 10 and 11 and approximate craft attitude index but also serves as the reference index for the pitch scale 75. Furthermore, in accordance with the present invention, the reference 9 and the pitch scale calibration at any instant cooperable therewith lie at a position in the instrument that is substantially in the plane including the viewing opening 13 (see Fig. 3). In this connection, it will be understood that by the term "plane of the opening" is meant a relatively thin volume defined by two relatively closely spaced, vertical planes in the instrument housing preferably located close to the bezel glass in relation to the pivotal axis 28 of sphere 25, and not the theoretical infinitely thin plane defined by a pair of intersecting lines, for example. In the illustrated embodiment "the plane of the opening" may be described as that substantially thin, circular volume defined by the inner surface of bezel glass 34 and wall 14 defining the opening 13.

In accordance with the present invention the cone of vision of the instrument is greatly increased by providing a roll angle indicator or roll pointer 85 cooperable with a roll angle scale 86, both pointer and scale being located in substantially the same plane of view as the pitch scale 75 and index 9, i. e., the plane including the opening 13 in wall 14. The front instrument wall 14, having viewing opening 13 therein, is provided with a rearwardly extending flange 82 adapted to support, through large diameter ball bearing 83, an annular ring 84 for rotation about the aircraft index 9, i. e., about an axis parallel to the roll axis of the aircraft. Secured to annular ring 84 is roll pointer 85 extending downwardly around flange 82 and then forwardly toward bezel glass 80 to a position preferably adjacent the front surface of wall 14. As shown in Figs. 1 and 2, the viewable surface of wall 14 has a plurality of roll indices 86 delineated thereon near the peripheral edge of opening 13 which are calibrated or spaced in accordance with angles of roll (for example plus or minus 0°, 10°, 20°, 30°, 60° and 90°). Therefore, the position of pointer 85 relative thereto provides an accurate measure of the roll angle of the aircraft, the pointer and scale being located very close to the front face of the instrument and viewable by the pilot from a wide range of angles.

Figure 4:
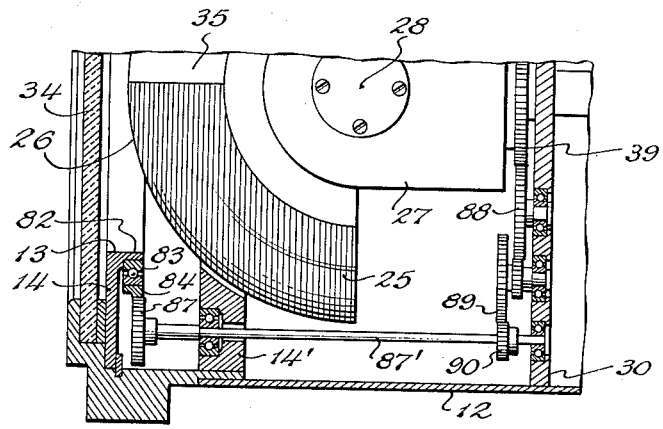
Fig. 4 is a partial cross section view of the instrument taken at about the line 4—4 of Fig. 1.

The means by which roll pointer 85 is positioned in accordance with roll angle of the aircraft is clearly illustrated in Fig. 4. As therein shown, a gear 87 in mesh with peripheral teeth on annular ring 84 is journalled by shaft 87' in wall 14' and partition 30 and is adapted to be driven in the same sense and preferably at the same speed as roll gimbal 27 through suitable transmission gearing 88, 89 and 90 in mesh with gearing 39 on gimbal 27. Thus, with the above construction, it can be seen that roll pointer 85, that is the roll angle indicator, is mounted separately from the member 25, which indicates roll attitude through tilting of horizon line 35, but is driven in accordance with movements of the latter through an auxiliary transmission system thereby providing a positive or accurate roll angle indication which is completely independent of pitch movements of the aircraft as illustrated clearly in Fig. 7. Furthermore, the roll angle indication is brought forward to a position adjacent the bezel glass 80 and thereby increases to a great extent the cone of vision of the instrument.

If desired, the gear ratio between gimbal 27 and roll index 85 may be other than linear or 1:1. For example, the angular displacement of roll pointer 85 may be increased for small roll angles and may be progressively decreased as the roll angle increases as by means of a non-linear gear train, cam, or the like just as in the case of pitch movement of spherical member 25 previously described.

The operation of the azimuth and elevation guidance indicators 10 and 11 in response to the signals received from the azimuth and elevation amplifiers 20 and 21 is identical to that described in the above-identified Kellogg patent and a detailed description thereof is deemed not necessary in the present application except to set forth that, with selector switch 65 in a position such as to enable the pilot to approach and maintain a selected radio beam by following the dictates of, say, the vertical pointer, a radio beam displacement signal provided by receiver 66, a signal proportional to the difference between the actual heading of the craft relative to the bearing of the radio beam as determined by compass 67 and heading selector 68, and a roll or bank attitude signal supplied by gyro 36 are algebraically combined in amplifier and limiter 20 in such a manner that the azimuth pointer 11 will remain on reference index 9 not only when the craft is on the radio beam but also when the craft is off the radio beam but in an attitude which will return the craft to the beam in a asymptotic manner. In other words, the vertical guidance pointer 11 is controlled not only in accordance with radio displacement signals, but also in accordance with craft attitude signals, and in particular a roll attitude signal, the latter signal being the control parameter of the system in azimuth whereby by controlling the roll attitude of the craft in accordance with the instantaneous deflections of the vertical or azimuth guidance pointer, the pilot will cause the craft to fly to the right or left, as the case may be, to approach and thereafter follow the selected flight path in azimuth. However, as set forth in detail above the pilot is further informed by movement of horizon line 35 behind the pointer 10 and of roll pointer 85 relative to scale 86 of the amount of craft control in roll he has had to apply in order to zero the azimuth pointer 10.

Likewise, and as more fully set forth in the above-identified Kellogg patent, the elevation guidance indicator 11 will be centered on the reference index 9 not only when the craft is on a guide slope radio beam of an I. L. S. system as determined by glide slope receiver 70 or at the desired selected altitude as determined by altimeter 71, as the case may be, but also when the craft is off the glide slope beam or altitude and in a pitch attitude which will return the craft asymptotically to the glide slope beam or to the selected altitude. Again, the pitch attitude of the craft is the controlling parameter of the system in elevation whereby by controlling the pitch attitude of the craft in accordance with the instantaneous deflections of the horizontal or elevation guidance pointers, the pilot will cause the craft to fly up or down, as the case may be, to approach and thereafter maintain the selected flight path in elevation. Again, and as set forth in detail in the above, the pilot is informed by movement of the horizon line 35 behind the pointer 11 and of the pitch scale relative to index 9 of the amount of craft control in pitch he has had to apply in order to zero the elevation pointer 11.

While I have described my invention in its preferred embodiment it is to be understood that the words which I have used are words of description rather than of limitation and that changes within the purview of the appended claims may be made without departing from the true scope and spirit of my invention in its broader aspects.

What is claimed is:

1. In an attitude indicator for aircraft the combination comprising a housing having a viewing opening in a wall thereof, indices on said wall adjacent said opening and calibrated in accordance with angles of roll, a member having a horizon-defining line thereon viewable through said opening, an element for pivotally supporting said member in said housing for rotation about an axis parallel to the roll axis of said aircraft, means for positioning said element and member in accordance with the roll attitude of said aircraft whereby to indicate the roll attitude of said aircraft relative to the horizon, an annular member rotatably supported in said housing for rotation about said roll axis, said annular member being located closely adjacent said wall and viewing opening, a roll pointer mounted on said annular member cooperable with said indices and viewable at said opening, and a driving connection between said element positioning means and said annular member for rotating said pointer in accordance with the position of said element about said roll axis whereby to indicate the magnitude of the roll angle of said aircraft.

2. In an attitude indicator for aircraft the combination comprising a housing having a viewing opening in a wall thereof, indices on said wall adjacent said opening and calibrated in accordance with angles of roll, a hemispherical member having a horizon-defining line thereon positioned in said housing to be viewed through said opening, gimbal means for pivotally supporting said member in said housing for rotation about axes parallel to the pitch and roll axes of said aircraft, means for positioning said gimbal and member in accordance with the pitch and roll attitude of said aircraft, whereby to indicate the attitude of said aircraft relative to the horizon, an annular ring rotatably supported on said wall for rotation about said roll axis and surrounding said viewing opening, a roll pointer cooperable with said indices mounted on said annular ring and viewable at said opening, and a driving connection between the means positioning said gimbal about said roll axis and said ring for positioning said pointer relative to said indices whereby to indicate the magnitude of the roll angle of said aircraft.

3. An attitude indicator for aircraft comprising a housing having a viewing opening in a wall thereof, a reference index positioned at said opening and substantially at the center thereof, a roll scale on said wall adjacent said opening and calibrated in accordance with angles of roll, a hemispherical member having a horizon-defining line thereon viewable through said opening, a gimbal ring for pivotally supporting said member in said housing for rotation about axes parallel to the pitch and roll axes of said aircraft, means including a vertical reference means for positioning said gimbal and member in accordance with the roll attitude of said aircraft and said member in accordance with the pitch attitude of said aircraft whereby to indicate the roll and pitch attitude of said aircraft relative to the horizon, a pitch scale on said member and cooperable with said index for indicating the magnitude of the pitch angle to said aircraft, an annular ring rotatably supported on said wall for rotation about said roll axis and surrounding said viewing opening, a roll pointer cooperable with said roll scale secured to said annular ring and viewable at said opening, and a gear connection between the means for positioning said gimbal about said roll axis and said ring for rotating said pointer in accordance with the position of said gimbal ring about said roll axis, whereby to indicate to the pilot the magnitude of the roll angle of said aircraft.

4. An attitude indicating instrument for aircraft comprising a housing having a viewing opening in a wall thereof, indices on said wall adjacent said opening and calibrated in accordance with angles of roll, a member having a horizon-defining line thereon viewable through said opening, means pivotally mounting said member in said housing for rotation about an axis parallel to the roll axis of said aircraft, means for positioning said member mounting means in accordance with the roll attitude of said aircraft whereby to indicate the roll attitude of said aircraft by movement of said member and horizon-defining line, a roll pointer mounted independently of said member and cooperable with said indices for indicating the angle of roll of said aircraft, and a driving connection between said pointer and said member positioning means for rotating said pointer in accordance with the position of said member about said roll axis.

References Cited in the file of this patent

UNITED STATES PATENTS

| 2,381,872 | Baker | Aug. 14, 1945 |
| 2,424,570 | Jenks | July 29, 1947 |
| 2,582,796 | Reid | Jan. 15, 1952 |
| 2,636,161 | Hoover | Apr. 21, 1953 |
| 2,696,597 | Chombard | Dec. 7, 1954 |